(12) United States Patent
Kim et al.

(10) Patent No.: US 8,614,971 B2
(45) Date of Patent: Dec. 24, 2013

(54) APPARATUS AND METHOD FOR TRANSMITTING/RECEIVING CONTROL INFORMATION FOR SUPPORTING MULTIMEDIA BROADCAST/MULTICAST SERVICE

(75) Inventors: Soeng-Hun Kim, Suwon-si (KR); Sung-Ho Choi, Suwon-si (KR); Kook-Heui Lee, Yongin-si (KR); Joon-Goo Park, Seoul (KR); Sung-Oh Hwang, Yongin-si (KR); Eun-Jung Kim, Suwon-si (KR); Kyeong-In Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1779 days.

(21) Appl. No.: 10/845,001

(22) Filed: May 13, 2004

(65) Prior Publication Data

US 2004/0228294 A1 Nov. 18, 2004

(30) Foreign Application Priority Data

May 14, 2003 (KR) .................................. 30639/2003

(51) Int. Cl.
*H04H 20/71* (2008.01)
*H04B 7/216* (2006.01)
*H04J 3/26* (2006.01)

(52) U.S. Cl.
USPC ............................ 370/312; 370/342; 370/432

(58) Field of Classification Search
USPC ............... 310/312, 432, 3.231; 370/312, 437, 370/469, 329, 335, 264–265, 313, 341–342, 370/431–432, 441, 476–480, 485–487, 524, 370/537, 541; 455/3.01, 3.04, 423, 461, 455/422.1, 455, 464, 3.02, 418–420, 434, 455/450, 509, 517, 550.1, 556.2, 561; 379/88.13, 265.09, 908; 707/E17.009; 713/163

See application file for complete search history.

(56) References Cited

U.S. PATENT DOCUMENTS 5,633,869 A  *  5/1997   Burnett et al. ................. 370/396
5,709,541 A       1/1998   Gensler et al.

(Continued)

FOREIGN PATENT DOCUMENTS

DE       101 38 717      2/2003
EP       1 467 586       10/2004

(Continued)

OTHER PUBLICATIONS

LG Information & Communications, Ltd.: "Definitions and Characteristics of Multicast Channels", TSG-RAN Working Group 2, Mar. 8, 1999.

(Continued)

*Primary Examiner* — Meless Zewdu
(74) *Attorney, Agent, or Firm* — The Farrell Law Firm, P.C.

(57) ABSTRACT

A mobile communication system supporting an MBMS service includes a Node B having a plurality of transport channels and at least one UE communicating with the Node B. The Node B selects a transport channel for MBMS control information among a plurality of transport channels mapped to a secondary common control physical channel; transmits a system information block indicating the selected transport channel to a cell area where UEs are located, using a primary common control physical channel; and transmits the MBMS control information to the cell area using the selected transport channel. The UE receives a system information block indicating a transport channel selected to transmit MBMS control information among a plurality of transport channels mapped to a secondary common control physical channel, over a primary common control physical channel; receives the MBMS control information over the selected transport channel among the plurality of the transport channels, using the system information block; and receives the MBMS service using the MBMS control information.

12 Claims, 11 Drawing Sheets

(56) References Cited

U.S. PATENT DOCUMENTS

| | | | |
|---|---|---|---|
| 6,807,192 B2* | 10/2004 | Terry | 370/469 |
| 6,850,540 B1* | 2/2005 | Peisa et al. | 370/468 |
| 6,868,075 B1* | 3/2005 | Narvinger et al. | 370/335 |
| 6,901,065 B1* | 5/2005 | Ehrstedt et al. | 370/341 |
| 6,965,579 B1* | 11/2005 | Shin | 370/312 |
| 6,990,359 B2* | 1/2006 | Wager | 455/561 |
| 7,239,621 B2* | 7/2007 | Eriksson | 370/335 |
| 7,515,922 B2 | 4/2009 | Kim et al. | |
| 2001/0016482 A1* | 8/2001 | Bergstrom et al. | 455/332 |
| 2002/0141331 A1* | 10/2002 | Mate et al. | 370/218 |
| 2002/0147021 A1* | 10/2002 | June | 455/452 |
| 2003/0007510 A1* | 1/2003 | Yeo et al. | 370/469 |
| 2003/0016008 A1 | 1/2003 | Christensen | |
| 2003/0035423 A1* | 2/2003 | Beckmann et al. | 370/390 |
| 2003/0036384 A1 | 2/2003 | Chen et al. | |
| 2003/0036403 A1 | 2/2003 | Shiu et al. | |
| 2003/0076812 A1* | 4/2003 | Benedittis | 370/350 |
| 2003/0108030 A1* | 6/2003 | Gao | 370/351 |
| 2003/0114177 A1 | 6/2003 | Sinnarajah et al. | |
| 2003/0119452 A1 | 6/2003 | Kim et al. | |
| 2003/0157952 A1* | 8/2003 | Sarkkinen et al. | 455/522 |
| 2003/0189914 A1 | 10/2003 | Zhao | |
| 2003/0194992 A1 | 10/2003 | Kim et al. | |
| 2003/0207691 A1* | 11/2003 | Chen | 455/450 |
| 2003/0207696 A1* | 11/2003 | Willenegger et al. | 455/522 |
| 2003/0211855 A1* | 11/2003 | Sarkkinen et al. | 455/466 |
| 2003/0228865 A1* | 12/2003 | Terry | 455/422.1 |
| 2004/0002342 A1* | 1/2004 | Goldberg et al. | 455/455 |
| 2004/0103435 A1 | 5/2004 | Yi et al. | |
| 2004/0184438 A1* | 9/2004 | Terry | 370/349 |
| 2004/0228301 A1* | 11/2004 | Rudolf et al. | 370/329 |
| 2005/0152398 A1* | 7/2005 | Shin | 370/469 |

FOREIGN PATENT DOCUMENTS

| | | |
|---|---|---|
| KR | 1020030080946 | 10/2003 |
| KR | 1020040016065 | 2/2004 |
| KR | 1020040016334 | 2/2004 |

OTHER PUBLICATIONS

"3$^{rd}$ Generation Partnership Project; Technical Specification Group Radio Access Network; Radio Resource Control (RRC); Protocol Specification (Release 1999)", Sep. 2002.

Siemens, "MBMS MAC Data format for MTCH and MCCH", 3GPP TSG RAN WG2 #34, Feb. 17-21, 2003.

Samsung, "M-RNTI for MBMS Control Channel (MCCH Structure)", 3GPP TSG RAN WG2 #34, Feb. 17-21, 2003.

Samsung, "Transport Channel and Physical Channel for MTCH and MCCH", 3GPP TSG RAN WG2 MBMS AD HOC, May 15-16, 2003.

* cited by examiner

| INFORMATION ELEMENT/GROUP NAME | NEED | MULTI | TYPE |
|---|---|---|---|
| SECONDARY CCPCH SYSTEM INFORMATION | MP | 1 TO <MAX SCCPCH> | |
| > SECONDARY CCPCH INFO | MP | | |
| > TFCS | MD | | |
| > FACH/PCH INFORMATION | MD | 1 TO <MAX FACH/PCH> | |
| >> TFS | MP | | |
| >> TRANSPORT CHANNEL IDENTITY | MP | | |
| >> CTCH INDICATOR | OP | | |
| >> PICH INFO | MP | | |
| >> MCCH INDICATOR | MP | | BOOLEAN |

FIG.7A

| INFORMATION ELEMENT/GROUP NAME | NEED | MULTI | TYPE |
|---|---|---|---|
| MCCH INFORMATION ELEMENT | MP | | |
| > TRANSPORT CHANNEL FOR MCCH | | 1 TO <MAX SCCPCH> | |
| >> SECONDARY CCPCH IDENTITY | MP | | INTEGER (1..16) |
| >> TRANSPORT CHANNEL IDENTITY | MP | | INTEGER (1..32) |
| > OTHER INFORMATION | | | |

FIG.7B

| INFORMATION ELEMENT/GROUP NAME | NEED | MULTI | TYPE |
|---|---|---|---|
| MCCH INFORMATION ELEMENT | MP | | |
| > TFS FOR MCCH | | 1 TO <MAX SCCPCH> | |
| >> SECONDARY CCPCH INFO | MP | | INTEGER (1..16) |
| >> TFS IDENTITY | MP | | INTEGER (1..8) |
| > OTHER INFORMATION | | | |

FIG.7C

APPARATUS AND METHOD FOR TRANSMITTING/RECEIVING CONTROL INFORMATION FOR SUPPORTING MULTIMEDIA BROADCAST/MULTICAST SERVICE

PRIORITY

This application claims priority under 35 U.S.C. §119 to an application entitled "Apparatus and Method for Transmitting/Receiving Control Information for Supporting Multimedia Broadcast/Multicast Service" filed in the Korean Intellectual Property Office on May 14, 2003 and assigned Serial No. 2003-30639, the contents of which are incorporated herein by reference.

BACKGROUND OF THE INVENTION

1. Field of the Invention

The present invention relates generally to a mobile communication system supporting a Multimedia Broadcast/Multicast Service (MBMS), and in particular, to an apparatus and method for transmitting and receiving control information for supporting an MBMS service.

2. Description of the Related Art

Currently, due to the development of communication technology, services provided in a Code Division Multiple Access (CDMA) mobile communication system are developing into Multicasting/Multimedia Communication for transmitting not only the existing voice service data but also mass data such as packet data and circuit data.

In a Universal Mobile Telecommunication Service (UMTS) system, which is a $3^{rd}$ generation (3G) mobile communication system employing Wideband Code Division Multiple Access (WCDMA) technology based on Global System for Mobile communications (GSM) and General Packet Radio Services (GPRS), Broadcast/Multicast Service in which the same data stream is provided from one data source to a plurality of user equipments (UEs) is supported in order to support the Multicasting/Multimedia Communication. The Broadcast/Multicast Service can be classified into Cell Broadcast Service (CBS), which is a message-oriented service, and Multimedia Broadcast/Multicast Service (hereinafter referred to as "MBMS service") for supporting multimedia data including real-time image and voice, still image, and text.

FIG. 1 is a diagram schematically illustrating a network configuration for providing an MBMS service in a mobile communication system. A broadcast/multicast-service center (BM-SC) 110 is a source that provides an MBMS stream, and the BM-SC 110 schedules an MBMS service stream and sends the scheduled MBMS service stream to a transit network (NW) 120. The transit network 120 is a network that exists between the BM-SC 110 and a serving GPRS support node (SGSN) 130, and sends the MBMS service stream provided from the BM-SC 110 to the SGSN 130. The transit network 120 is comprised of a gateway GPRS support node (GGSN) and an external network.

The SGSN 130 receiving an MBMS service stream via the transit network 120 controls an MBMS service for the subscribers, i.e., UEs 161, 162, 163, 171 and 172, desiring to receive the MBMS service. For example, the SGSN 130 manages MBMS service accounting data for each of the subscribers, and selectively transmits MBMS service data to an associated radio network controller (RNC) 140. In addition, the SGSN 130 generates and manages a service context for the MBMS service and sends a stream for the MBMS service to the RNC 140.

The RNC 140 transmits the MBMS service stream to Node Bs 160 and 170 controlling the cells where the UEs 161, 162, 163, 171 and 172 requesting an MBMS service are located, among the Node Bs managed by the RNC 140 itself. The RNC 140 and the Node Bs 160 and 170 constitute a UMTS terrestrial radio access network (UTRAN).

A cell#1 belonging to Node B1 160 desiring to receive a particular MBMS service includes UE1 161, UE2 162 and UE3 163, and a cell#2 belonging to Node B2 170 includes UE4 171 and UE5 172. Herein, the term "cell" has a meaning similar to that of the term "Node B." In this case, the RNC 140 controls radio channels set up between Node Bs 160 and 170 and UEs 161, 162, 163, 171 and 172 in order to provide the MBMS service. As illustrated in FIG. 1, one radio channel is established between one Node B, e.g., Node B1 160, and UEs 161 to 163 belonging to the Node B1 160 in order to provide an MBMS service.

In order to receive an MBMS service, UEs 161, 162, 163, 171 and 172 first acquire control information for an MBMS transport channel (MTCH), for transporting an MBMS service data stream. The control information includes code information for a code channel to which the transport channel is mapped and information on a service identity (ID) for the MBMS service, and is transmitted over an MBMS control channel (MCCH), a separate logical channel distinguished from the transport channel.

The control information for the MBMS service as well as the MBMS service data must be transmitted on a multicast basis. In particular, radio bearer (RB) information for an MBMS service is available for all UEs desiring to receive the MBMS service. However, if an MCCH, like other logical channels, is mapped to all transport channels before being transmitted, the UEs must decode all logical channels in order to receive the MCCH, causing an increase in its load. Thus, there is a demand for technology for enabling UEs to rapidly and simply receive control information for an MBMS service in order to rapidly receive the MBMS service in a cell.

SUMMARY OF THE INVENTION

It is, therefore, an object of the present invention to provide an apparatus and method for efficiently transmitting control information for supporting an MBMS service in a Node B supporting MBMS services.

It is another object of the present invention to provide an apparatus and method for efficiently receiving, by a UE, MBMS control information from a Node B.

According to one aspect of the present invention, there is provided a method for transmitting Multimedia Broadcast/Multicast Service (MBMS) control information for supporting an MBMS service to a user equipment (UE) by a Node B in a mobile communication system including the Node B having a plurality of transport channels and at least one UE communicating with the Node B and supporting the MBMS service. The method comprises selecting a transport channel for MBMS control information among a plurality of transport channels mapped to a secondary common control physical channel; transmitting a system information block indicating the selected transport channel to a cell area where UEs are located, using a primary common control physical channel; and transmitting the MBMS control information to the cell area using the selected transport channel.

According to another aspect of the present invention, there is provided a method for receiving Multimedia Broadcast/

Multicast Service (MBMS) control information for supporting an MBMS service transmitted from a Node B by a user equipment (UE) in a mobile communication system including the Node B having a plurality of transport channels and at least one UE communicating with the Node B and supporting the MBMS service. The method comprises receiving a system information block indicating a transport channel selected to transmit MBMS control information among a plurality of transport channels mapped to a secondary common control physical channel, over a primary common control physical channel; receiving the MBMS control information over the selected transport channel among the plurality of the transport channels, using the system information block; and receiving the MBMS service using the MBMS control information.

According to further another aspect of the present invention, there is provided an apparatus for receiving Multimedia Broadcast/Multicast Service (MBMS) control information for supporting an MBMS service transmitted from a Node B by in a mobile communication system including the Node B having a plurality of transport channels and supporting the MBMS service. The apparatus comprises a receiver for receiving data on a secondary common control physical channel to which a plurality of transport channels including a transport channel selected to transmit MBMS control information are mapped, according to information on the secondary common control physical channel; a buffer for storing the data on the secondary common control physical channel received from the receiver; a transport channel discriminator for selecting data on the selected transport channel from the data on the secondary common control physical channel stored in the buffer according to a system information block indicating the selected transport channel, and causing the buffer to output the selected data; and a transport channel processor for analyzing the data on the selected transport channel output from the buffer and acquiring the MBMS control information for the MBMS service.

BRIEF DESCRIPTION OF THE DRAWINGS

The above and other objects, features and advantages of the present invention will become more apparent from the following detailed description when taken in conjunction with the accompanying drawings in which:

FIGS. 7A to 7C are diagrams illustrating formats of a control signal for supporting an MBMS service according to first to third embodiments of the present invention;

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention provides an apparatus and method for efficiently transmitting/receiving control information related to an MBMS service, and in particular, to an apparatus and method for transmitting MBMS control information over a transport channel selected from a plurality of transport channels available for a Node B, and informing UEs of control information for the selected transport channel through system information blocks of a common channel.

As set forth below, a detailed description will be made of a structure of an MBMS control channel for transmitting MBMS control information and a method for mapping the MBMS control channel to a channel of a lower layer. Specifically, a description will be made of how to use a physical channel, a transport channel and a logical channel on a radio link for transmitting MBMS control information. As is well known in the art, a plurality of logical channels are mapped to one transport channel and a plurality of transport channels are mapped to one physical channel.

Before a description of preferred embodiments of the present invention is given, an MBMS service for a UE will be described.

Figure 1:
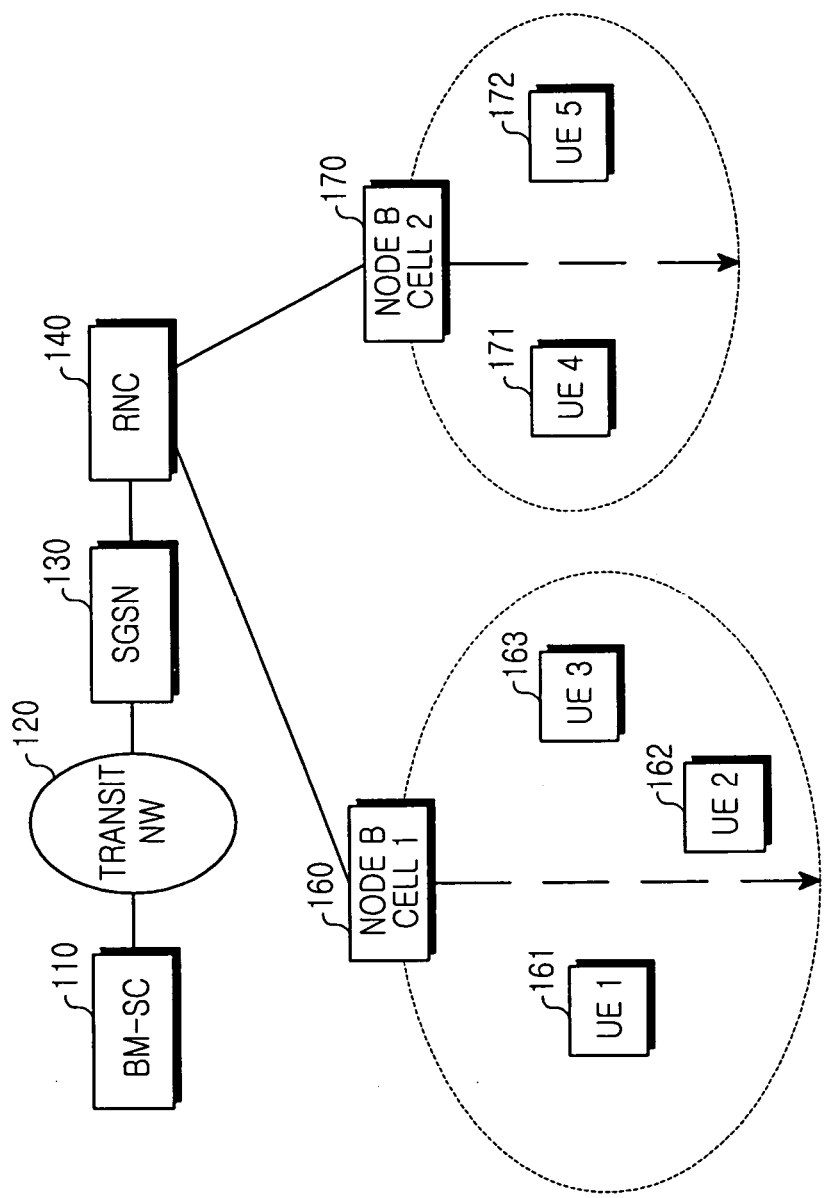
FIG. 1 is a diagram schematically illustrating a configuration of a general mobile communication system supporting an MBMS service.
Figure 2:
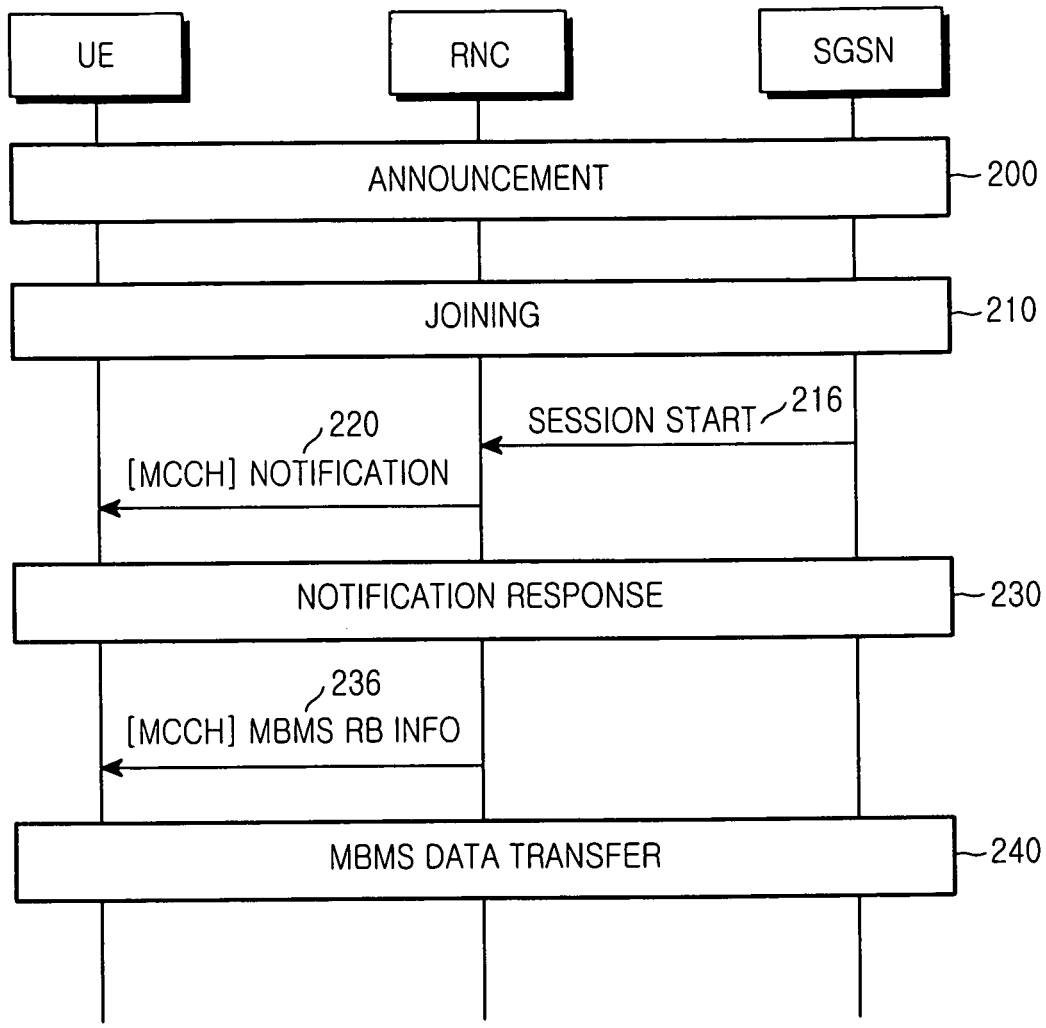
FIG. 2 is a diagram illustrating a procedure for supporting an MBMS service in a mobile communication system.

FIG. 2 is a diagram illustrating a procedure for performing an MBMS service between an RNC and a UE in a typical MBMS system. In FIG. 2, an RNC provides an MBMS service to UEs desiring to receive an MBMS service via a Node B (not shown). In addition, an SGSN is connected to a BM-SC (not shown) and manages the MBMS service.

Referring to FIG. 2, in step 200, an SGSN informs UEs of fundamental information for an MBMS service, e.g., IDs, service start times and service durations of MBMS services available in a BM-SC (Announcement). In step 210, UEs desiring to receive the MBMS service transmit their request messages to join to the SGSN (Joining). Each of the joining request messages includes an identification code of an MBMS service desired by the corresponding UE and an ID of the corresponding UE. Then the SGSN performs authentication on the UEs, and informs the UEs of their availability for the MBMS service. At this time, the SGSN stores a list of UEs desiring to receive the MBMS service and positions of the corresponding UEs.

If the BM-SC informs the UE of a start of the MBMS service, the SGSN transmits in step 216 a session start message to an RNC where the joined UEs are located (Session Start). In step 220, the RNC transmits a notification message using a common channel such as a secondary common control physical channel (S-CCPCH) in order to page the UEs (Notification). Notification is a process of informing corresponding Ues, by the SGSN, that the MBMS will be started shortly. The notification message can be transmitted over an MCCH.

In step 230, the paged UEs transmit their response messages to the notification message (Notification Response). Through reception of the response messages, the RNC can determine the number of UEs desiring to receive the MBMS service for each cell, and determine a type of a radio channel for the corresponding cell. For example, when a plurality of UEs located in a particular cell desire to receive an MBMS service, the MBMS service is provided over a common channel, while when the number of UEs desiring to receive an MBMS service is a small number or one, the MBMS service is provided over dedicated channels for the UEs.

In step 236, the UEs that transmitted the response message set up a radio bearer for the MBMS service using MBMS service information, particularly, RB information (called MBMS RB information), transmitted over MCCH by the RNC (MBMS RB Info). The MBMS RB information includes radio channel information, for example, orthogonal variable spreading factor (OVSF) code, transport format (TF), radio link control (RLC) configuration information, packet data convergence control (PDCP) configuration information, and the like. In step 240, the RNC provides an MBMS service data stream over the radio bearer and the UEs receive the MBMS service data stream over the radio bearer.

In preferred embodiments of the present invention, MCCH is control information related to an MBMS service, and is used to transport a notification message and MBMS RB information. The MCCH has the following characteristics:

1. One MCCH is set up for each cell;
2. MCCH is transmitted over a common physical channel such as a secondary common control physical channel (S-CCPCH);
3. MCCH is transmitted over a common transport channel, such as a forward access channel (FACH), which is mapped to a common physical channel; and
4. UEs acquire information on MCCH being set up for each cell, using system information.

A description will now be made of S-CCPCH and FACH to which the MCCH is mapped.

In a communication system, particularly, in a UMTS communication system, a primary common control physical channel (P-CCPCH) and a secondary common control physical channel (S-CCPCH) are used to transmit common system information such as cell configuration in order to provide a communication service. The above physical channels are different code channels using different spreading codes, and one or more common transport channels are mapped to each of the physical channels.

In order to enter a cell and communicate with the cell, a UE first receives system information related to the cell. The system information is transmitted over P-CCPCH in the form of a system information block (SIB).

Figure 3:
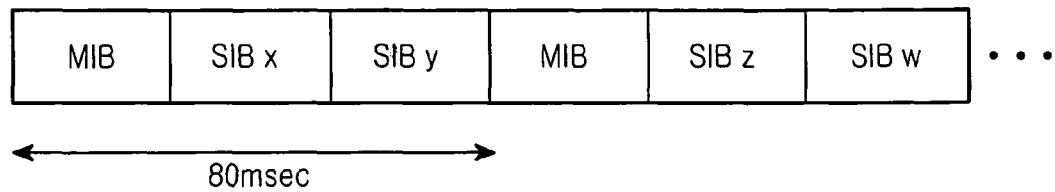
FIG. 3 is a diagram illustrating a structure of a primary common control physical channel (P-CCPHC)

A typical structure of the P-CCPCH is illustrated in FIG. 3. As illustrated, P-CCPCH is spread using a first code C(256,1) among 256 OVSF codes for a corresponding cell. The P-CCPCH transmits one master information block (MIB) and two system information blocks (SIBs) for each 80 msec period.

The MIB includes scheduling information for the SIBs and information used for determining whether system information is changed, and is repeatedly transmitted every 80 msec. The SIB is classified into a total of 16 kinds of SIBs according to the types of information contained therein, and several typical SIBs will be described herein below by way of example.

SIB 1 contains various timer and counter values and information related to a core network (CN). SIB 2 contains an ID of a UTRAN registration area (URA) to which a corresponding cell belongs. SIB 3 contains information necessary for cell selection and reselection. SIB 4 contains information necessary for cell selection and reselection, to be used by a UE in a connected mode. SIB 5 contains information related to common transport channels established in a corresponding cell. SIB 6 contains information related to common transport channels of a corresponding cell, to be used by a UE in a connected mode. The common transport channels include a reverse access channel (RACH), a forward access channel (FACH), and a paging channel (PCH).

A UE not having a dedicated channel (DCH) receives SIBs transmitted over the P-CCPCH and stores necessary information in order to receive a service from a particular cell. In particular, the UE receives S-CCPCH-related information of a corresponding cell through SIB 5 or SIB 6, and accesses S-CCPCH using the information. For convenience, a combination of SIB 5 and SIB 6 will be referred to as SIB 5/6.

Figure 4:
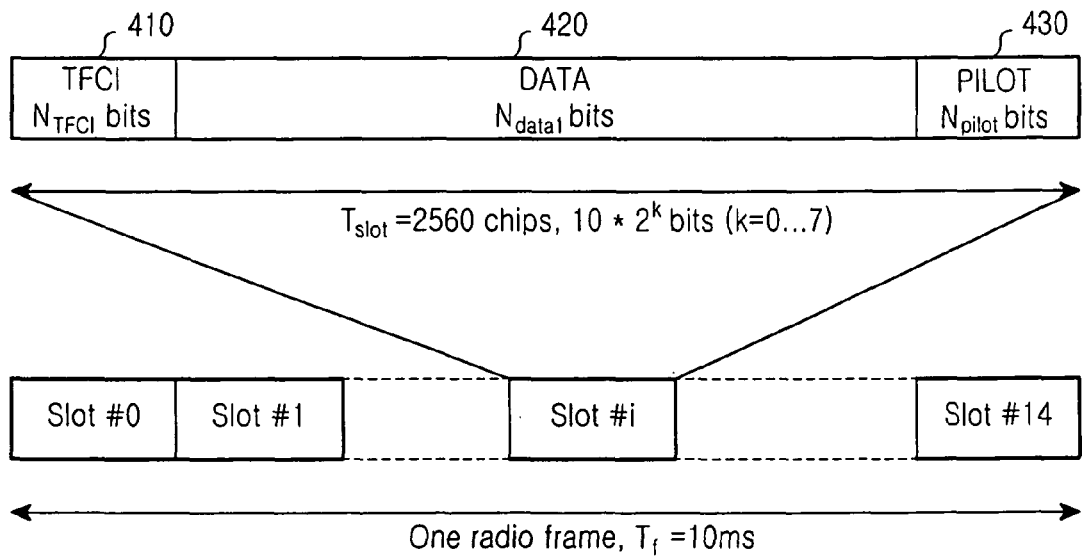
FIG. 4 is a diagram illustrating a structure of a secondary common control physical channel (S-CCPCH)

FIG. 4 is a diagram illustrating a structure of S-CCPCH. Referring to FIG. 4, the S-CCPCH includes common transport channels such as a forward access channel (FACH) and a paging channel (PCH) of an upper layer. One radio frame of 10-ms S-CCPCH is comprised of 15 slots, and each slot is comprised of a Data part 420, a transport format combination indicator (TFCI) part 410, and a Pilot part 430. Data part 420 contains FACH or PCH, and TFCI part 410 contains TFCI information indicating a transport format of data transmitted through Data part 420. Pilot part 430 contains pilot bits constituting identification information of a corresponding cell.

The number of bits transmitted over each part is determined according to a spreading factor (SF) of an OVSF code assigned to the S-CCPCH, and information necessary for accessing the S-CCPCH is broadcasted to UEs located in a corresponding cell through SIB 5 or SIB 6.

The FACH, which is mapped to Data part 420, is a common transport channel shared by a plurality of UEs. However, user data or control information can be transmitted to a particular UE over the FACH. That is, a UE ordered by an RNC to stay in a particular state (herein, a Cell_FACH state) receives all data on FACH transmitted over the S-CCPCH, and processes or discards data referring to a header part of the received data.

A plurality of S-CCPCHs can be established in one cell, and a plurality of FACHs are mapped to each S-CCPCH. A mapping relation between the S-CCPCHs and the FACHs will be described in detail with reference to FIG. 5.

Figure 5:
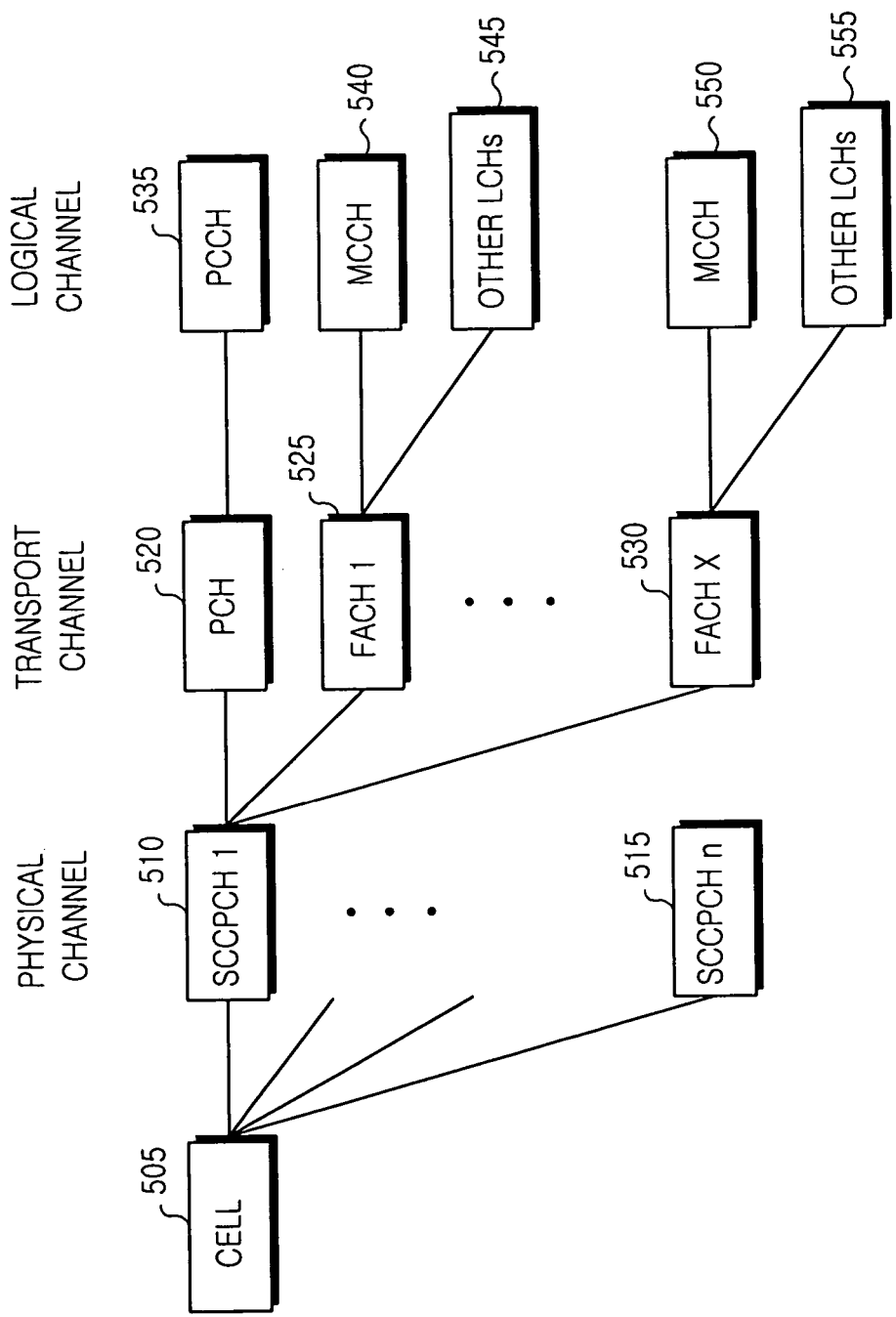
FIG. 5 is a diagram illustrating a channel for transmitting a control signal for supporting an MBMS service.

Referring to FIG. 5, a plurality of S-CCPCHs 510 to 515 are established in one cell 505. The S-CCPCHs 510 to 515 are physical channels each including PCH 520 and FACHs 525 to 530. One PCH 520 or no PCH can be mapped to each S-CCPCH 510, and one or more FACHs 525 to 530 are mapped to each S-CCPCH 510. Because the maximum number of transport channels that can be mapped to one S-CCPCH 510 is 8, a maximum of 8 FACHs can be established in any one S-CCPCH 510.

A logical channel mapped to the PCH 520 is a paging control channel (PCCH) 535, and transmits a paging message for a particular UE. Logical channels mapped to each of the FACHs 525 to 530 include a dedicated control channel (DCCH), a dedicated traffic channel (DTCH), a broadcast control channel (BCCH), a common control channel (CCCH), a common traffic channel (CTCH), and the like, and in FIG. 5, these logical channels are denoted by "Other LCHs." Because the logical channels are transmitted and received over one transport channel, i.e., FACH, a medium access control (MAC) layer processing logical channels divides the logical channels using additional information called "target channel type field (TCTF)." In addition, when an MBMS service is provided, MCCHs 540 and 550 are mapped to the FACHs 525 and 530 together with the other logical channels 545 and 555, respectively.

A description will now be made of an operation of receiving, by a UE, MBMS control information over MCCH.

A UE stores radio signals received over S-CCPCH. The radio signals include a TFCI value illustrated in FIG. 4. The UE can identify a transport channel to which radio signals received at a particular time are mapped, based on the TFCI value. Therefore, UEs desiring to receive MCCH detect only the radio signals corresponding to FACH, selectively detect data corresponding to the MCCH from the radio signals corresponding to the FACH using the TCTF information, and send the detected data to an upper layer.

It will be assumed that one PCH and 2 FACHs (FACH 1 and FACH 2) are established in S-CCPCH. The UE has recognized transport format combination set (TFCS) information of the S-CCPCH and transport format set (TFS) information of each transport channel through system information.

The TFS is uniquely assigned to each transport channel. One TFS includes a plurality of transport formats (TFs), and each TF is identified by a transport-format identity (TFI) and is comprised of parameters for a semi-static part and a dynamic part. The semi-static part is composed of parameters applied to all TFs of a transport channel, and includes a transmission time interval (TTI) for which data on the transport channel is transmitted and received, channel coding and a coding rate to be applied to the data on the transport channel, and a bit size of a cyclic redundancy code (CRC) for error detection. The dynamic part is composed of parameters uniquely applied to each transport format of a transport channel, and includes an amount (or transport block size) of data transmitted and received per unit time.

The TFCS is assigned to a physical channel, e.g., S-CCPCH herein, and includes transport format combination identities (TFCIs) which are identities of transport format combinations of transport channels mapped to the S-CCPCH. For example, TFCI 0 means a combination of TFI 0 of PCH, TFI 0 of FACH 1 and TFI 0 of FACH 2. In the case of the S-CCPCH, the contents (i.e. each TFCI) of the TFCS and a size (indicating how many TFCIs are used to form the TFCS) of the TFCS are given as system information.

Because a UE has recognized TFCS of a received S-CCPCH and TFS of each transport channel, the UE can determine a transport channel to which data belongs based on TFCI values of radio signals transmitted over the S-CCPCH. Therefore, a UE desiring to receive MCCH detects and processes only the radio signals belonging to FACH 1 and FACH 2, and thereafter, selectively receives only MCCH data by analyzing TCTF.

However, if MCCHs, like the other logical channels, are transmitted through all FACHs as shown in FIG. 5, the UE inefficiently processes all FACHs of the S-CCPCH in a physical layer. In order to resolve this problem, in preferred embodiments of the present invention, MCCH is mapped to any one of the FACHs of the S-CCPCH.

Figure 6:
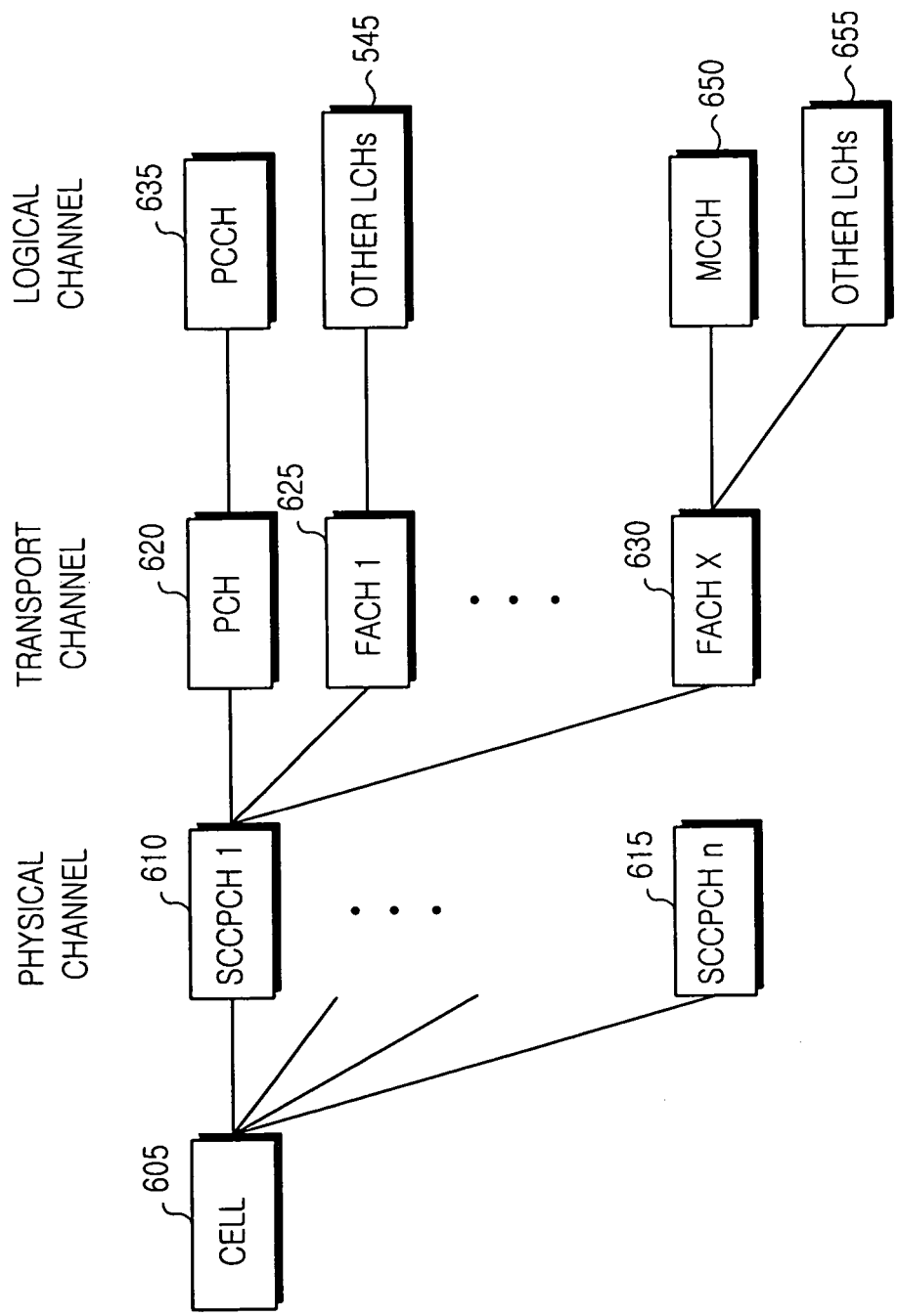
FIG. 6 is a diagram illustrating a channel for transmitting a control signal for supporting an MBMS service according to an embodiment of the present invention.

FIG. 6 is a diagram illustrating a structure of a transport channel for MCCH according to a preferred embodiment of the present invention. Referring to FIG. 6, a plurality of FACHs 625 to 630 to which PCCH 635 or other logical channels 640 and 655 are mapped are established in S-CCPCH#1 610 of a cell 605, and MCCH 650 is mapped to a particular FACH#X 630. An RNC notifies FACH to which MCCH is to be mapped (hereinafter, referred to as FACH_MCCH), through system information. UEs desiring to receive MBMS control information, i.e., MCCH data, recognize TFS of FACH_MCCH and TFCS of S-CCPCH including FACH_MCCH (hereinafter, referred to as S-CCPCH_MCCH) through the system information. The UEs process only the data corresponding to the FACH_MCCH by analyzing TFCI of the S-CCPCH. In this case, the UE does not receive FACHs not carrying MCCH, but receives only the FACHs carrying MCCH. For the system information, a system information element (IE) can added to the existing SIB or a new SIB can be used.

A description will now be made of various embodiments of the present invention for notifying S-CCPCH and FACH to which MCCH is mapped. In the embodiments described below, FACH_MCCH represents FACH over which MCCH is transmitted, and FACH_MCCH information represents information based on which a UE can recognize the FACH over which MCCH is transmitted. In addition, S-CCPCH including FACH_MCCH will be referred to as "S-CCPCH_MCCH."

First Embodiment

In a first embodiment, an RNC transmits FACH_MCCH information through SIB 5/6.

FIG. 7A is a diagram illustrating a format of system information including FACH_MCCH information according to a first embodiment of the present invention.

In a mobile communication system, the system information exchanged between a UE and an RNC is comprised of a plurality of information elements (IEs) 725 to 765 illustrated in FIG. 7A. The IE is a unit of information that can be analyzed by transmission and reception sides. An RNC includes S-CCPCH system information shown in FIG. 7A in a corresponding SIB before broadcasting in order to notify UEs of information on S-CCPCH uniquely established for each cell.

An attribution of each of the IEs constituting the system information is divided into Need 710, Multi 715 and Type 720.

The Need 710 is a value indicating whether a corresponding IE should be necessarily present in a corresponding message or an upper IE. MP (Mandatory Present) indicates that the corresponding IE should be necessarily present in a corresponding message or an upper IE, whereas OP (Optional) indicates that the corresponding IE can be optionally present according to circumstances. Each IE can be comprised of a plurality of lower IEs, and a plurality of the lower IEs can constitute one upper IE. The upper IE and the lower IE are relative to each other. For example, Secondary CCPCH system information 725 is an uppermost IE, and includes Secondary CCPCH info 730, TFCS 735 and FACH/PCH information 740, all of which are marked with ">." In addition, TFS 745, Transport Channel Identity 750, CTCH indicator 755, PICH (Paging Indicator Channel) info 760, and MCCH indicator 765, all of which are marked with ">>," are lower IEs included in the FACH/PCH information 740.

Multi 715 indicates the maximum possible number of corresponding IEs, and a blank means that the maximum number of corresponding IEs is one. In FIG. 7A, it is shown that the Secondary CCPCH info 730 and the TFCS 735 each have one IE, as do TFS 745 through MCCH indicator 765. The Type 720 indicates a type in which a corresponding IE is coded. Though a corresponding IE is expressed with an integer during its actual transmission, it is interpreted as a value corresponding to each integer in a reception side. In addition, Boolean means that a corresponding IE is expressed by either 'true' and 'false', and Integer means that a corresponding IE is coded into an integer.

Secondary CCPCH system information 725 is transmitted through SIB 5 and SIB 6 as stated above, and a UE uses information on SIB 5 or information on SIB 6 according to its condition. S-CCPCH configuration information configuring a cell is transmitted through Secondary CCPCH system information 725, and Secondary CCPCH system information 725 is comprised of the Secondary CCPCH info 730, TFCS 735 and FACH/PCH information 740.

Secondary CCPCH info 730 includes OVSF code information of a corresponding S-CCPCH, and TFCS 735 includes TFCS information, or TFCIs, of the corresponding S-CCPCH. FACH/PCH information 740 includes information related to transport channels mapped to the corresponding S-CCPCH.

For each transport channel mapped to a corresponding S-CCPCH, FACH/PCH information 740 includes TFSs 745 of corresponding transport channels, Transport Channel Identity 750, CTCH indicator 755 indicating whether a common traffic channel (CTCH) is mapped to a corresponding transport channel, and PICH info 760 matched with a corresponding PCH when the corresponding transport channel is the PCH. The number of FACH/PCH information 740 is identical to the number of transport channels established in the corresponding S-CCPCH.

Assuming that two S-CCPCHs have been established in a particular cell and a first S-CCPCH is comprised of one PCH and one FACH while a second S-CCPCH is comprised of FACH1 and FACH2, a description will now be made of system information for each S-CCPCH in order to describe the first embodiment of the present invention.

An example of Secondary CCPCH system information 725 for the first S-CCPCH is defined below.

---

Secondary CCPCH info (730) = C(256, 16)
TFCS (735) = [(TFCI 0 = TFI 0, TFI 0), (TFCI 1 = TFI 0, TFI 1), (TFCI 2 = TFI 1, TFI 0), (TFCI 3 = TFI 1, TFI 1)]
TFS for PCH (745) = [(Semi Static part = 10 msec TTI, 1/2 CC, 8 bit CRC), (Dynamic part = (TF 0 = 0 bit), (TF 1 = 150 bit)]
Transport Channel Identity (750) = 1
CTCH indicator (755) = false
PICH info (760)
MCCH indicator (765) = false
TFS for FACH (745) = [(Semi Static part 10 msec TTI, 1/2 CC, 8 bit CRC), (Dynamic part = (TF 0 = 0 bit), (TF 1 = 200 bit)]
Transport Channel Identity (750) = 2
CTCH indicator (755) = false
MCCH indicator (765) = true

---

According to the above example, FACH of the first S-CCPCH is assigned as FACH_MCCH.

An example of Secondary CCPCH system information 725 for the second S-CCPCH is defined below.

---

Secondary CCPCH info (730) = C(256, 32)
TFCS (735) = [(TFCI 0 = TFI 0, TFI 0), (TFCI 1 = TFI 0, TFI 1), (TFCI 2 = TFI 1, TFI 0), (TFCI 3 = TFI 1, TFI 1)]
TFS for FACH 1 (745) = [(Semi Static part = 10 msec TTI, 1/2 CC, 8 bit CRC), (Dynamic part = (TF 0 = 0 bit), (TF 1 = 200 bit)]
Transport Channel Identity (750) = 32
CTCH indicator (755) = true
MCCH indicator (765) = true
TFS for FACH 2 (745) = [(Semi Static part = 10 msec TTI, 1/3 CC, 16 bit CRC), (Dynamic part = (TF 0 = 0 bit), (TF 1 = 150 bit)]
Transport Channel Identity (750) = 31
CTCH indicator (755) = false
MCCH indicator (765) = true

---

According to the above example, FACH1 of the second S-CCPCH is assigned as FACH_MCCH.

In the first embodiment of the present invention, a lower IE called MCCH indicator 765 is included in FACH/PCH information 740 in which FACH information is described. Because TFS 745 and Transport Channel identity 750 for FACH to which a particular MCCH is to be mapped are included in one IE of FACH/PCH information 740, MCCH indicator 765 which is set to 'true' is inserted into the FACH/PCH information 740. For FACHs to which MCCH is not to be mapped, MCCH indicator 765 of the FACH/PCH information 740 is set to 'false'.

After recognizing S-CCPCH configuration information used for configuring a cell and configuration information of FACHs configured in each S-CCPCH through the Secondary CCPCH system information 725, a UE desiring to receive MCCH regards FACH where MCCH indicator 765 is coded into 'true' as FACH_MCCH. During transmission of SIB 5/6, while forming Secondary CCPCH system information 725, an RNC sets MCCH indicator 765 to 'true' in FACH/PCH information 740 for FACHs for transmitting MCCHs, and sets MCCH indicator 765 of FACHs not transmitting MCCH to 'false'.

2. Second Embodiment

In a second embodiment, an MCCH IE comprised of MCCH-related information is newly defined, and a Secondary CCPCH identity and a transport channel identity, which are FACH_MCCH information, are included in the MCCH IE. FIG. 7B is a diagram illustrating system information including an MCCH IE according to a second embodiment of the present invention.

Referring to FIG. 7B, the MCCH IE 770 is an upper IE including information related to MCCH to be uniquely established for each cell, and includes a lower IE called Transport Channel for MCCH 772 containing information on a FACH over which MCCH will be transmitted. Transport Channel for MCCH 772 includes a Secondary CCPCH identity 774 and a Transport Channel identity 775.

The Secondary CCPCH identity 774 is an identity indicating S-CCPCH over which FACH_MCCH is transmitted. For example, when FACH_MCCH is mapped to a third S-CCPCH, the Secondary CCPCH identity 774 becomes 3. Here, the order of S-CCPCHs is identical to the order of the system information described in the SIB 5/6.

Transport Channel identity 775 is an identity indicating FACH_MCCH, i.e., FACH to which MCCH is mapped. Transport Channel identity 775 has a value between 1 and 32, and an RNC inserts a transport channel identity of the FACH_MCCH into Transport Channel identity 775. Transport Channel identity 775 is identical to Transport Channel identity 750 of a corresponding channel included in Secondary CCPCH system information 725. Other Information 778 includes other information related to MCCH, and a description thereof will be omitted herein, as it is not directly related to the present invention.

Assuming that two S-CCPCHs have been established in a particular cell and a first S-CCPCH is comprised of one PCH and one FACH while a second S-CCPCH is comprised of FACH1 and FACH2, a description will now be made of system information for each S-CCPCH in order to describe the second embodiment.

If FACH of the first S-CCPCH is FACH_MCCH, the Secondary CCPCH identity 774 of Transport Channel for MCCH 772 becomes '1' and Transport Channel Identity 775 becomes '2'. If FACH1 of the second S-CCPCH is FACH_MCCH, Secondary CCPCH identity 774 of Transport Channel for MCCH 772 becomes '2', and the Transport Channel Identity 775 becomes '32'.

If FACH of the first S-CCPCH and FACH1 of the second S-CCPCH are both FACH_MCCH, two IEs of Transport Channel for MCCH 772 are used. For this purpose, MCCH IE 770 has IEs of S-CCPCH identity=1 and transport channel identity=2, and IEs of S-CCPCH identity=2 and transport channel identity=32.

3. Third Embodiment

In a third embodiment, FACH_MCCH information is notified using not a transport channel identity but a TFS identity. FIG. 7C is a diagram illustrating IEs necessary for notifying FACH_MCCH using TFS identity according to a third embodiment of the present invention.

After selecting FACH_MCCH, an RNC forms a MCCH IE 780 including an IE called TFS for MCCH 782 with information on the FACH_MCCH and notifies the formed MCCH IE 780 as system information. TFS for MCCH 782 is comprised of lower IEs of a Secondary CCPCH Identity 784 and a TFS identity 786. Secondary CCPCH Identity 784 has the same information as Secondary CCPCH Identity 774 of FIG. 7B. That is, Secondary CCPCH Identity 784 is an identity of S-CCPCH to which FACH_MCCH is mapped. The TFS Identity 786 means a TFS identity of FACH_MCCH, and is used to identify a transport channel, like Transport Channel Identity 775 of FIG. 7B. Transport Channel Identity 775 has a value of a maximum of 32, but a maximum of 8 TFSs exist for one S-CCPCH. Therefore, the TFS Identity 786 has a value of a maximum of 8, contributing to a reduction in its size. That is, the third embodiment provides a method for notifying to which transport channel the FACH_MCCH corresponds in the corresponding Secondary CCPCH system information.

Assuming that two S-CCPCHs have been established in a particular cell and a first S-CCPCH is comprised of one PCH and one FACH while a second S-CCPCH is comprised of FACH1 and FACH2, a description will now be made of system information for each S-CCPCH in order to describe the third embodiment.

If FACH1 of the second S-CCPCH is FACH_MCCH, Secondary CCPCH identity 784 of TFS for MCCH 782 becomes '2', and TFS identity 786 becomes '1'. If FACH of the first S-CCPCH and FACH1 of the second S-CCPCH are both FACH_MCCH, two IEs of TFS for MCCH 782 are used. For that purpose, MCCH IE 780 has IEs of S-CCPCH identity=1 and TFS identity=2, and IEs of S-CCPCH identity=2 and TFS identity=1.

Figure 8:
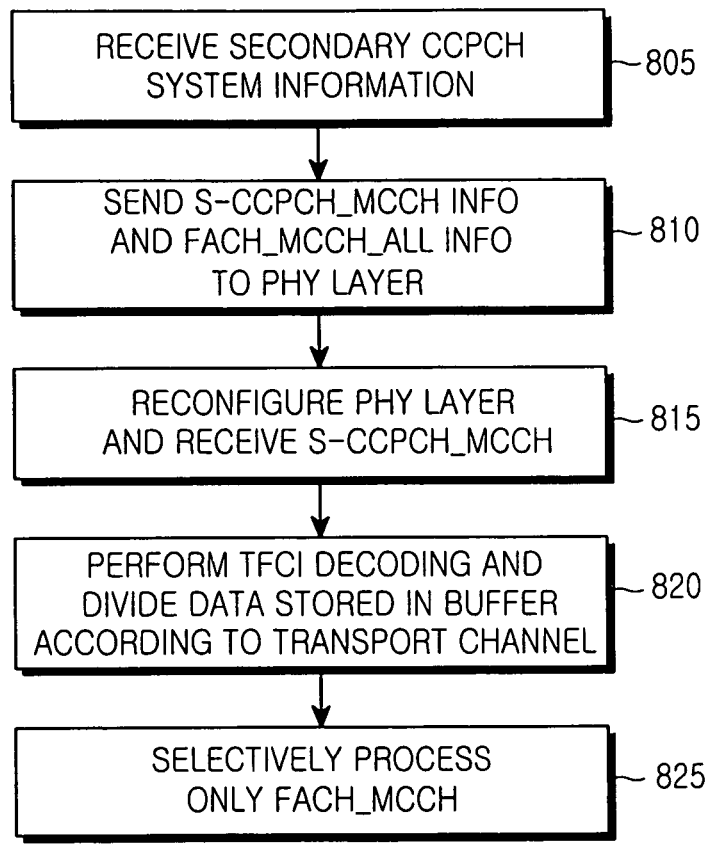
FIG. 8 is a flow chart illustrating a process of receiving a control signal by a UE according to a first embodiment of the present invention.

FIG. 8 is a flow chart diagram illustrating an operation of receiving MCCH by a UE according to a first embodiment of the present invention. A UE located in a particular cell acquires system information of the corresponding cell in order to receive an MBMS service supported by an RNC. The system information is transmitted from the RNC to a Node B controlling the cell, and includes an IE called Secondary CCPCH system information 725. In step 805, the UE receives Secondary CCPCH system information 725. Secondary CCPCH system information 725 is included in, for example, SIB 5/6 that is transmitted over P-CCPCH.

In step 810, the UE extracts S-CCPCH_MCCH information and FACH_MCCH_ALL information included in Secondary CCPCH system information 725. S-CCPCH_MCCH information is Secondary CCPCH system information 725 including FACH/PCH information 740 in which MCCH indicator 765 is set to 'true'. That is, S-CCPCH_MCCH information includes Secondary CCPCH info 730, TFCS 735 and FACH/PCH information 740 shown in FIG. 7A. FACH_MCCH_ALL information means the Transport Channel Identity 750 of FACH_MCCH.

In step 815, the UE reconfigures a physical layer according to the S-CCPCH_MCCH information and the FACH_MCCH_ALL information, and receives S-CCPCH data through the physical layer. That is, the UE configures a physical channel de-channelization section for receiving S-CCPCH, a transport channel discriminator, and transport channel processors, using Secondary CCPCH info 730, TFCS 735 and FACH/PCH information 740 of the S-CCPCH_MCCH information. The FACH_MCCH_ALL information, i.e., the Transport Channel Identity 750 of FACH_MCCH, is transmitted to the transport channel discriminator. A detailed structure of the de-channelization section, the transport channel discriminator, and the transport channel processors will be described with reference to FIG. 10. The received S-CCPCH data is formed with data on a plurality of transport channels mapped to the S-CCPCH, and stored in a buffer before being provided to the transport channel processors.

In step 820, the UE detects TFCI values included in TFCS 735 of the received S-CCPCH_MCCH information. The transport channel discriminator of the UE analyzes the TFCI values, and determines transport channels to which S-CCPCH data stored in the buffer corresponds, according to the analyzed TFCI values of the S-CCPCH_MCCH. For example, when half of the data stored in the buffer is FACH1 data and the rest is FACH2 data, the transport channel discriminator prepares to transmit the data to a corresponding transport channel processor.

In step 825, the transport channel discriminator of the UE forwards data corresponding to the FACH_MCCH out of the S-CCPCH data stored in the buffer to a corresponding transport channel processor. In this case, data on other transport channels unnecessary for the MBMS service can discarded from the buffer without being transmitted to the transport channel processor. By performing such an operation, the UE selectively processes only MCCH data, i.e., MBMS control information, transmitted over a selected FACH.

Figure 9:
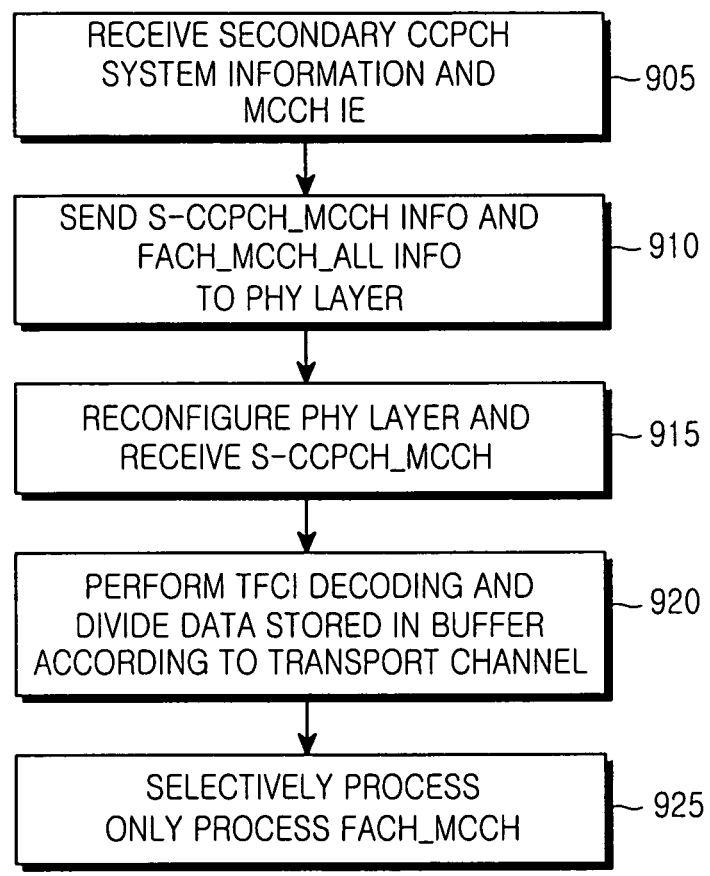
FIG. 9 is a flow chart illustrating a process of receiving a control signal by a UE according to second and third embodiments of the present invention.

FIG. 9 is a flow chart diagram illustrating an operation of receiving MCCH by a UE according to second and third embodiments of the present invention. In step 905, the UE receives Secondary CCPCH system information 725 and MCCH IEs 770 and 780. Secondary CCPCH system information 725 includes parameters related to a typical S-CCPCH not including information on FACH_MCCH, and is formed with other IEs with the exception of MCCH indicator 765 in the S-CCPCH system information shown in FIG. 7A. Secondary CCPCH system information 725 is included in SIB 5/6. MCCH IEs 770 and 780 can be included in a new SIB.

In step 910, the UE extracts S-CCPCH_MCCH information and FACH_MCCH_ALL information from Secondary CCPCH system information 725 and MCCH IEs 770 and 780, respectively. The FACH_MCCH_ALL information will be separately described for the second embodiment and the third embodiment.

In the second embodiment, when a value of Secondary CCPCH Identity 774 of MCCH IE 770 is assumed as 'x', Secondary CCPCH info 730 and TFCS 735 of $x^{th}$ Secondary CCPCH system information 725 are regarded as S-CCPCH_MCCH information. In addition, when a value of Transport Channel Identity 775 of the MCCH IE 770 is defined as 'y', a transport channel in which Transport Channel Identity 750 in information on transport channels included in the $x^{th}$ Secondary CCPCH system information 725 is 'y' is regarded as FACH_MCCH. TFS 745 and Transport Channel Identity 750 of the FACH_MCCH are regarded as FACH_MCCH_ALL information.

In the third embodiment, when a value of Secondary CCPCH identity 784 of MCCH IE 780 is assumed as 'x', Secondary CCPCH info 730 and TFCS 735 of $x^{th}$ Secondary CCPCH system information 725 are regarded as S-CCPCH_MCCH information. In addition, when a value of TFS Identity 786 of MCCH IE 780 is defined as 'y', a $y^{th}$ transport channel among transport channels included in the $x^{th}$ Secondary CCPCH system information 725 is regarded as FACH_MCCH. TFS 745 and Transport Channel Identity 750 of the FACH_MCCH are regarded as FACH_MCCH_ALL information.

In step 915, the UE reconfigures a physical layer according to the S-CCPCH_MCCH information and the FACH_MCCH_ALL information, and receives S-CCPCH data through the physical layer. That is, the UE configures a physical channel de-channelization section for receiving S-CCPCH, a transport channel discriminator, and transport channel processors, using Secondary CCPCH info 730, TFCS 735 and FACH/PCH information 740 of the S-CCPCH_MCCH information. The FACH_MCCH_ALL information, i.e., the Transport Channel Identity 750 of FACH_MCCH, is transmitted to the transport channel discriminator. A detailed structure of the de-channelization section, the transport channel discriminator, and the transport channel processors will be described with reference to FIG. 10. The received S-CCPCH data is formed with data on transport channels mapped to the S-CCPCH, and stored in a buffer before being provided to the transport channel processors.

In step 920, the UE detects TFCI values included in TFCS 735 of the received S-CCPCH_MCCH information. The transport channel discriminator of the UE analyzes the TFCI values, and determines transport channels to which S-CCPCH data stored in the buffer corresponds, according to the analyzed TFCI values of the S-CCPCH_MCCH. For example, when half of the data stored in the buffer is FACH1 data and the rest is FACH2 data, the transport channel discriminator prepares to transmit the data to a corresponding transport channel processor.

In step 925, the transport channel discriminator of the UE forwards data corresponding to the FACH_MCCH out of the S-CCPCH data stored in the buffer to a corresponding transport channel processor. By performing such an operation, the UE selectively processes only MCCH data, i.e., MBMS control information, transmitted over a selected FACH.

Figure 10:
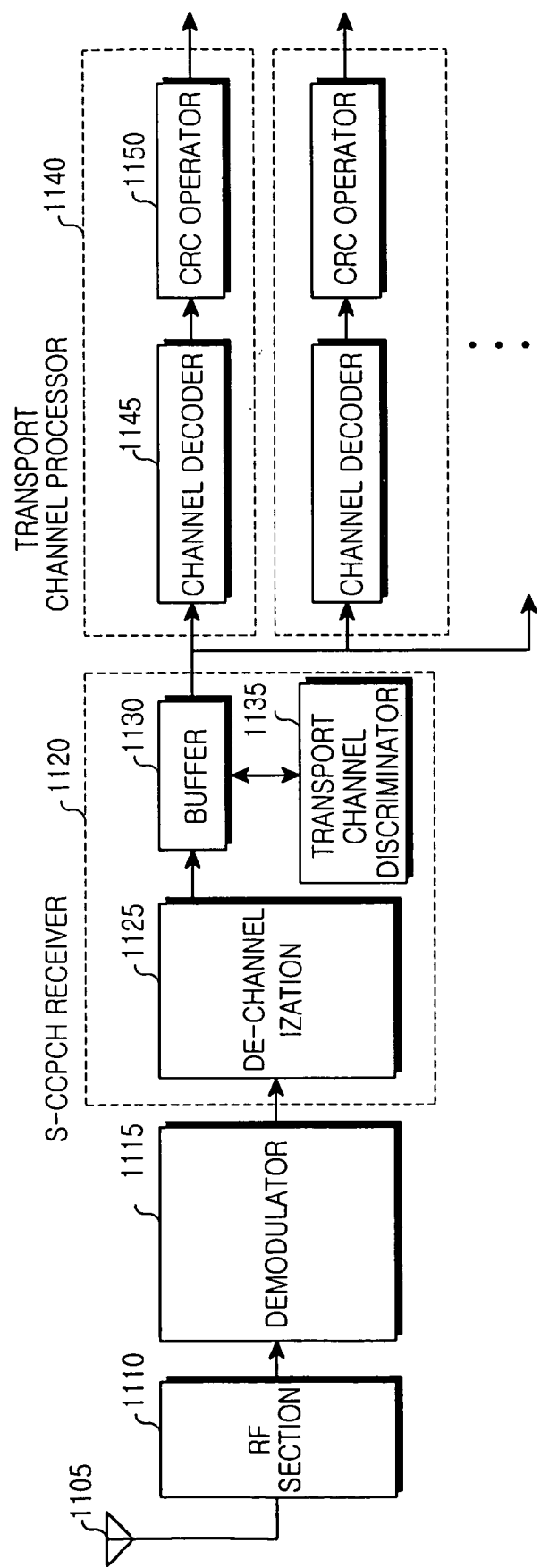
FIG. 10 is a block diagram illustrating a UE's structure for receiving an MBMS service according to a preferred embodiment of the present invention.

FIG. 10 is a block diagram illustrating a UE's structure for receiving MCCH according to a preferred embodiment of the present invention. Referring to FIG. 10, a reception antenna 1105 receives a signal on a radio link transmitted from a Node B that controls a cell where a UE is located, and provides the received radio signal to a radio frequency (RF) section 1110. The RF section 1110 converts the radio signal into a baseband signal, and provides the converted baseband signal to a demodulator 1115. The demodulator 1115 demodulates the baseband signal, and provides the demodulated signal to an S-CCPCH receiver 1120. The S-CCPCH receiver 1120 includes of a de-channelization section 1125, a buffer 1130, and a transport channel discriminator 1135.

The de-channelization section 1125 acquires a plurality of IEs of Secondary CCPCH system information 725 through previously received system information, and extracts S-CCPCH data by de-channelizing the demodulated signal using Secondary CCPCH info 730, i.e., an OVSF code for S-CCPCH, of the Secondary CCPCH system information 725. The extracted S-CCPCH data is stored in buffer 1130.

The S-CCPCH data is formed with a data field and a TFCI field as shown in FIG. 4. The transport channel discriminator 1135 divides S-CCPCH data stored in buffer 1130 into data for a plurality of transport channels using TFCS 735 of Secondary CCPCH system information 725 and TFS 745 of each transport channel, and then analyzes TFCIs of the data on the transport channels. The transport channel discriminator 1135 determines to which transport channel processor 1140 it should forward the data stored in buffer 1130. Here, if two or more FACH_MCCHs are assigned to two or more S-CCPCHs, two or more transport channel processors 1140 for separately proceeding data on the FACH_MCCHs are used in order to acquire MBMS control information.

In the first embodiment, the transport channel discriminator 1135 analyzes MCCH indicator 765 of FACH/PCH information 740 of each transport channel and determines a transport channel whose MCCH indicator 765 is set to 'true' as FACH_MCCH. If it is determined that FACH1 of a second S-CCPCH is FACH_MCCH, the transport channel discriminator 1135 selects FACH_MCCH data, i.e., S-CCPCH data in which a TFCI value of the FACH_MCCH among TFCIs included in the TFCS 735 is set to '1', and forwards the selected FACH_MCCH data to the transport channel processor 1140 in order to acquire MBMS control information necessary for an MBMS service.

In the second embodiment, the transport channel discriminator 1135 determines FACH_MCCH by analyzing S-CCPCH Identity 774 and Transport Channel Identity 775 of MCCH IE 770. If the S-CCPCH Identity 774 is '2' indicating a second S-CCPCH and the Transport Channel Identity 775 is '32' indicating FACH1, the transport channel discriminator 1135 regards FACH1 of the second S-CCPCH as FACH_MCCH, selects FACH_MCCH data, i.e., S-CCPCH data in which a TFCI value of the FACH_MCCH among TFCIs included in TFCS 735 is set to '1', and forwards the selected FACH_MCCH data to the transport channel processor 1140 in order to acquire MBMS control information necessary for an MBMS service.

In the third embodiment, the transport channel discriminator 1135 determines FACH_MCCH by analyzing S-CCPCH Identity 784 and TFS Identity 786 of MCCH IE 780. If the S-CCPCH Identity 784 is '2' indicating a second S-CCPCH and the TFS Identity 786 is '1' indicating FACH1, the transport channel discriminator 1135 regards FACH1 of the second S-CCPCH as FACH_MCCH, selects FACH_MCCH data, i.e., S-CCPCH data in which a TFCI value of the FACH_MCCH among TFCIs included in TFCS 735 is set to '1', and forwards the selected FACH_MCCH data to the transport channel processor 1140 in order to acquire MBMS control information necessary for an MBMS service.

The transport channel processor 1140 is comprised of a channel decoder 1145 and a CRC operator 1150. Channel coding parameters and CRC-related parameters included in TFS 745 of S-CCPCH system information 725 received by the UE are used for configuration of the transport channel processor 1140. The channel decoder 1145 channel-decodes FACH_MCCH data provided from the buffer 1130 and provides the channel-decoded FACH_MCCH data to CRC operator 1150. CRC operator 1150 performs a CRC operation on the decoded FACH_MCCH data, and delivers a CRC-removed pure data part to an upper layer if the CRC result is 'good' or 'no error'. The upper layer acquires MBMS control information by analyzing the pure data part, and uses the MBMS control information for an MBMS service.

As understood from the foregoing description, the present invention transmits MBMS control information to a particular cell area over only one transport channel, so UEs are allowed to process only the transport channel over which the MBMS control information is transmitted, thereby contributing to efficient data processing.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting Multimedia Broadcast/Multicast Service (MBMS) control information for supporting an MBMS service in a mobile communication system including a network and a mobile station, the method comprising:
   configuring, by the network, a Secondary Common Control Physical Channel (S-CCPCH) system information MBMS message to include Forward Access Channel (FACH) information for at least one FACH, the FACH information including MBMS Control Channel (MCCH) configuration information indicating that an MCCH is included within a FACH of the at least one FACH; and
   transmitting, from the network to the mobile station, the S-CCPCH system information MBMS message including the FACH information,
   wherein the FACH information comprises a Transport Format Set (TFS) indicating transport formats of the at least one FACH, and
   wherein the TFS comprises semi-static transport format information and dynamic transport format information.

2. The method of claim 1, wherein the S-CCPCH system information MBMS message comprises a Transport Format Combination Set (TFCS) including Orthogonal Variable Spreading Factor (OVSF) code information of the S-CCPCH and Transport Format Combination Indicators (TFCIs) of the S-CCPCH.

3. The method of claim 1, wherein the FACH information further comprises an identity of the FACH, an indicator indicating whether a common traffic channel is mapped to the FACH, and information on a paging indicator channel existing when the FACH is a paging channel.

4. A method for receiving Multimedia Broadcast/Multicast Service (MBMS) control information for supporting an MBMS service transmitted in a mobile communication system including a network and a mobile station, the method comprising:
   receiving, by the mobile station from the network, a Secondary Common Control Physical Channel (S-CCPCH) system information MBMS message;
   determining, by the mobile station, Forward Access Channel (FACH) information for at least one FACH from the S-CCPCH system information MBMS message;
   determining, by the mobile station, MBMS Control Channel (MCCH) configuration information indicating that an MCCH is included within the FACH from the S-CCPCH system information MBMS message; and
   receiving, by the mobile station from the network, the MBMS control information within a FACH of the at least one FACH,
   wherein the FACH information comprises a Transport Format Set (TFS) indicating transport formats of the at least one FACH, and
   wherein the TFS comprises semi-static transport format information and dynamic transport format information.

5. The method of claim 4, wherein the S-CCPCH system information MBMS message comprises a Transport Format Combination Set (TFCS) including Orthogonal Variable Spreading Factor (OVSF) code information of the S-CCPCH and Transport Format Combination Indicators (TFCIs) of the S-CCPCH.

6. The method of claim 4, wherein the FACH information further comprises an identity of the FACH, an indicator indicating whether a common traffic channel is mapped to the FACH, and information on a paging indicator channel existing when the FACH is a paging channel.

7. An apparatus for transmitting Multimedia Broadcast/Multicast Service (MBMS) control information for supporting an MBMS service in a mobile communication system, the apparatus comprising:
   means for configuring a Secondary Common Control Physical Channel (S-CCPCH) system information MBMS message to include Forward Access Channel (FACH) information for at least one FACH, the FACH information including MBMS Control Channel (MCCH) configuration information indicating that an MCCH is included within a FACH of the at least one FACH, before transmitting the S-CCPCH system information MBMS message; and
   means for transmitting the S-CCPCH system information MBMS message including the FACH information,
   wherein the FACH information comprise a Transport Format Set (TFS) indicating transport formats of the at least one FACH, and
   wherein the TFS comprises semi-static transport format information and dynamic transport format information.

8. The apparatus of claim 7, wherein the S-CCPCH system information MBMS message comprises a Transport Format Combination Set (TFCS) including Orthogonal Variable Spreading Factor (OVSF) code information of the S-CCPCH and Transport Format Combination Indicators (TFCIs) of the S-CCPCH.

9. The apparatus of claim 7, wherein the FACH information further comprises an identity of the FACH, an indicator indicating whether a common traffic channel is mapped to the FACH, and information on a paging indicator channel existing when the FACH is a paging channel.

10. An apparatus for receiving Multimedia Broadcast/Multicast Service (MBMS) control information for supporting an MBMS service transmitted in a mobile communication, the apparatus comprising:
    a receiver for receiving Secondary Common Control Physical Channel (S-CCPCH) system information MBMS message;
    a transport channel discriminator for determining Forward Access Channel (FACH) information for at least one FACH from the S-CCPCH system information MBMS message and for determining MBMS Control Channel (MCCH) configuration information indicating that an MCCH is included within the FACH from the S-CCPCH system information MBMS message; and
    a transport channel processor for receiving the control information within a FACH of the at least one FACH,
    wherein the FACH information comprise a Transport Format Set (TFS) indicating transport formats of the at least one FACH, and
    wherein the TFS comprises semi-static transport format information and dynamic transport format information.

11. The apparatus of claim 10, wherein the S-CCPCH system information MBMS message comprises a Transport Format Combination Set (TFCS) including Orthogonal Variable Spreading Factor (OVSF) code information of the S-CCPCH and Transport Format Combination Indicators (TFCIs) of the S-CCPCH.

12. The apparatus of claim 10, wherein the FACH information further comprises an identity of the FACH, an indicator indicating whether a common traffic channel is mapped to the FACH, and information on a paging indicator channel existing when the FACH is a paging channel.

* * * * *